United States Patent
Cook

(10) Patent No.: US 9,165,308 B2
(45) Date of Patent: Oct. 20, 2015

(54) SYSTEM AND METHOD FOR LOADING OF WEB PAGE ASSETS

(71) Applicant: TagMan Inc.

(72) Inventor: Paul Cook, Bletchingley (GB)

(73) Assignee: Tagman Inc., San Jose, CA (US)

( * ) Notice: Subject to any disclaimer, the term of this patent is extended or adjusted under 35 U.S.C. 154(b) by 60 days.

(21) Appl. No.: 13/623,025

(22) Filed: Sep. 19, 2012

(65) Prior Publication Data

US 2013/0073401 A1 Mar. 21, 2013

Related U.S. Application Data

(60) Provisional application No. 61/537,001, filed on Sep. 20, 2011.

(51) Int. Cl.
*G06Q 30/02* (2012.01)

(52) U.S. Cl.
CPC ..................... *G06Q 30/02* (2013.01)

(58) Field of Classification Search
USPC ....................... 705/14.73; 715/234
See application file for complete search history.

(56) References Cited

U.S. PATENT DOCUMENTS

| | | | |
|---|---|---|---|
| 6,487,604 | B1 | 11/2002 | Rochford et al. |
| 6,633,312 | B1 | 10/2003 | Rochford et al. |
| 6,654,803 | B1 | 11/2003 | Rochford et al. |
| 6,691,282 | B1 | 2/2004 | Rochford et al. |
| 7,389,343 | B2 | 6/2008 | Busch et al. |
| 7,584,435 | B2 | 9/2009 | Bailey et al. |
| 7,587,433 | B2 | 9/2009 | Peleg et al. |
| 7,885,942 | B2 | 2/2011 | Chand et al. |
| 7,890,451 | B2 | 2/2011 | Cancel et al. |
| 7,941,394 | B2 | 5/2011 | Error |
| 8,140,963 | B2 | 3/2012 | Watson |

(Continued)

FOREIGN PATENT DOCUMENTS

| | | |
|---|---|---|
| EP | 1094635 A2 | 4/2001 |
| EP | 1105790 A1 | 6/2001 |

(Continued)

OTHER PUBLICATIONS

Google Tag Manager: http://blog.intlock.com/my-google-tag-manager-wishlist/#more-1113.*

(Continued)

*Primary Examiner* — Thomas M Hammond, III
*Assistant Examiner* — Breffni X Baggot
(74) *Attorney, Agent, or Firm* — Banner & Witcoff, Ltd.

(57) ABSTRACT

The present solution is directed to methods and systems for asynchronously loading tag management code and vendor tags on a web page while remaining portions of the web page load. An application executing on a device may receive a web page comprising a configuration object configured to asynchronously load tag management code. The configuration object may load asynchronously, upon execution by the application, the tag management code into memory of the application while the application continues to load a remainder of the web page. The tag management code may request, while the application continues to load the remainder of the web page, one or more vendor tags from a server over a network. The tag management code may receive, while the application continues to load the remainder of the web page, a vendor tag from the server.

26 Claims, 11 Drawing Sheets

(56) References Cited

U.S. PATENT DOCUMENTS

| | | | |
|---|---|---|---|
| 8,713,424 B1* | 4/2014 | Kuhn et al. | 715/234 |
| 2003/0097421 A1 | 5/2003 | Wille et al. | |
| 2003/0154442 A1 | 8/2003 | Papierniak | |
| 2004/0199605 A1 | 10/2004 | LaCroix et al. | |
| 2005/0065855 A1* | 3/2005 | Geller | 705/26 |
| 2005/0209863 A1 | 9/2005 | Presler-Marshall et al. | |
| 2007/0011304 A1 | 1/2007 | Error | |
| 2007/0112856 A1 | 5/2007 | Schram et al. | |
| 2007/0244650 A1 | 10/2007 | Gauthier | |
| 2007/0288247 A1 | 12/2007 | Mackay | |
| 2007/0299743 A1 | 12/2007 | Staib et al. | |
| 2007/0299964 A1 | 12/2007 | Wong et al. | |
| 2008/0040473 A1 | 2/2008 | Larsson et al. | |
| 2008/0052278 A1 | 2/2008 | Zlotin et al. | |
| 2008/0086454 A1 | 4/2008 | Bahadori et al. | |
| 2008/0183858 A1 | 7/2008 | Error | |
| 2008/0184116 A1 | 7/2008 | Error | |
| 2008/0189281 A1 | 8/2008 | Cancel et al. | |
| 2008/0201242 A1 | 8/2008 | Minnis et al. | |
| 2008/0201643 A1 | 8/2008 | Nagaitis et al. | |
| 2008/0215631 A1 | 9/2008 | Abraham et al. | |
| 2008/0228819 A1 | 9/2008 | Minnis et al. | |
| 2008/0270471 A1 | 10/2008 | Schon | |
| 2009/0024748 A1 | 1/2009 | Goldspink et al. | |
| 2009/0100139 A1 | 4/2009 | Purdy et al. | |
| 2009/0100154 A1 | 4/2009 | Stevenson et al. | |
| 2009/0112918 A1 | 4/2009 | Terrell | |
| 2009/0164884 A1* | 6/2009 | Watson | 715/234 |
| 2009/0177796 A1 | 7/2009 | Falk et al. | |
| 2009/0182718 A1 | 7/2009 | Waclawik et al. | |
| 2009/0193497 A1 | 7/2009 | Kikuchi et al. | |
| 2009/0204478 A1 | 8/2009 | Kaib et al. | |
| 2009/0248484 A1 | 10/2009 | Surendran et al. | |
| 2009/0287713 A1 | 11/2009 | Anderson et al. | |
| 2009/0292677 A1 | 11/2009 | Kim | |
| 2009/0327353 A1 | 12/2009 | Zhuge et al. | |
| 2010/0017384 A1 | 1/2010 | Marinescu | |
| 2010/0030894 A1 | 2/2010 | Cancel et al. | |
| 2010/0049627 A1 | 2/2010 | Geppert et al. | |
| 2010/0235494 A1 | 9/2010 | Sood et al. | |
| 2010/0235749 A1 | 9/2010 | Ratnakar | |
| 2010/0251128 A1 | 9/2010 | Cordasco | |
| 2010/0281389 A1 | 11/2010 | Hutchinson | |
| 2010/0318976 A1 | 12/2010 | Everly et al. | |
| 2010/0332962 A1 | 12/2010 | Hammer et al. | |
| 2011/0029899 A1* | 2/2011 | Fainberg et al. | 715/760 |
| 2011/0035486 A1 | 2/2011 | Seolas et al. | |
| 2011/0185016 A1* | 7/2011 | Kandasamy et al. | 709/203 |
| 2011/0302485 A1* | 12/2011 | D'Angelo et al. | 715/234 |
| 2012/0030559 A1* | 2/2012 | Manion et al. | 715/234 |
| 2012/0072488 A1* | 3/2012 | Manion et al. | 709/203 |
| 2012/0131431 A1* | 5/2012 | Watson | 715/208 |
| 2013/0073401 A1 | 3/2013 | Cook | |
| 2014/0089782 A1 | 3/2014 | Cook | |

FOREIGN PATENT DOCUMENTS

| | | | |
|---|---|---|---|
| EP | 1108309 A1 | 6/2001 | |
| EP | 1108312 A1 | 6/2001 | |
| EP | 1145167 A2 | 10/2001 | |
| EP | 1264261 A2 | 12/2002 | |
| EP | 1997041 A1 | 12/2008 | |
| EP | 2141614 A1 | 1/2010 | |
| EP | 2199969 A1 | 6/2010 | |
| GB | 2412805 A | 10/2005 | |
| WO | 0079374 A1 | 12/2000 | |
| WO | 0103023 A2 | 1/2001 | |
| WO | 0103374 A1 | 1/2001 | |
| WO | 0103378 A1 | 1/2001 | |
| WO | 2008024706 A2 | 2/2008 | |
| WO | 2008137522 A2 | 11/2008 | |
| WO | 2010119379 A1 | 10/2010 | |
| WO | 2011084843 A1 | 7/2011 | |

OTHER PUBLICATIONS

Tag Failed to Load (NPL: http://stackoverflow.com/questions/538745/how-to-tell-if-a-script-tag-failed-to-load).* http://tealium.com/blog/tag/universal-tag/page/2/.* http://econsultancy.com/reports/tag-management-buyers-guide.*

Sep. 18, 2014—(PCT) Search Report—App. PCT/US 14/28930, 11 pages.

Nov. 3, 2014—(EP) Search Report—App No. 11853671.3—1870 / 2659367 PCT/US2011067870.

Phu H Phung et al, "Lightweight self-protecting JavaScript", Mar. 10-12, 2009 Sydney, Australia, © 2009 ACM, pp. 47-60.

Mar. 14, 2012—(US) Non-Final Office Action—U.S. Appl. No. 12/685,268.

Sep. 6, 2012—(US) Final Office Action—App. 12/685,268.

European Search Report dated Jun. 2, 2014, Application No./Patent No. 10842752.7—1954/2524317 PCT/US2010061997, 9 pages.

2009 Seventh Annual Communication Networks and Services Research Conference, "Workload Characterization of a Large Systems Conference Web Server", Aniket Mahanti, et al., © 2009 IEEE, pp. 55 through 64.

PCT International Search Report mailed Sep. 18, 2014, International Application No. PCT/US 14/28930, 11 pages.

Final Office Action for U.S. Appl. No. 13/305,282, filed Aug. 27, 2012, 19 pages.

Non-Final Office Action mailed Mar. 14, 2012, U.S. Appl. No. 13/305,282, 24 pages.

"List of HTTP header fields", Wikipedia, the free encyclopedia webpage http://en.wikipedia.org/wiki/List_of HTTP_header_fields#Reqeusts, Aug. 11, 2011, 7 pp Wikimedia Foundation Inc.

Chenghsien Yu, et al. "A Study of Using Automatic Text Indexing to Analyze Web Browsing Behavior" Proceedings of the 5" World Congress on Intelligent Control and Automations, Jun. 15-19, 2004, Hangzhou, P.R. China.

Yong Tan, et al. "Analysis of a least recently used cache management policy for web browsers" Operations Research, v. 50, n 2, p. 345-57, Jan. 1999.

Christian von der Weth, et al.,"COBS: Realizing Decentralized Infrastructure for Collaborative Browsing and Search", 2011 Internationl Conference on Advanced Information Networking and Applications, (AINA 2011), p. 617-24, 2011, Mar. 22-25, 2011.

Hui Chen, et al., "Business-to-Consumer Mobile Agent- Based Internet Commerce System (MAGICS)", IEEE Transactions on Systems, Man, and Cybernetics—Part C: Applications and Reviews, vol. 37, No. 6, pp. 1174-1189, Nov. 1, 2007.

W. Ulam, et al. "Technical considerations in remote LIMS access via the World Wide Web", J Autom, Methods Manag. Chem. (UK); v 2005, n 4, pp. 217-22, Dec. 11, 2005.

Victor Pascual-Cid, "An Information Visualisation System for the Understanding of Web Data", VAST'08—IEEE Symposium on Visual Analytics Science and Technology, Proceedings, p. 183-184, Oct. 21, 2008.

Alison Lee, et al. "Browsers to Support Awareness and Social Interaction", IEEE Computer Graphics and Applications, v 24, n 5, p. 66-75, Sep. 1, 2004.

Peterson, Eric T., "The Coming Revolution in Web Analytics," copyright 2009, pp. 1-18, SAS Institute Inc.

Manion, Josh, "Data Collection Part 1-Single Methodologies," retrieved Nov. 6, 2009, pp. 1-3, Stratigent, LLC.

Resig, John. Website: www.ejohn.org, retrieved Feb. 18, 2010.

Website: www.tealium.com, retrieved Jan. 26, 2010.

Website: www.monetate.com, retrieved Feb. 22, 2010.

Website: www.speed-trap.com, retrieved Jan. 26, 2010.

Website: www.tagman.com, retrieved Jan. 26, 2010.

Website: www.sitetagger.co.uk, retrieved Jan. 26, 2010.

Crockford, Douglas, "The JavaScript Minifier," Dec. 4, 2003, pp. 1-2, website: http://www.crockford.com/javascript/jsmin.html.

Crockford, Douglas, "PHP Adaptation of JSMin" JSMIN_lib.pho (for PHP 4, 5), retrieved on Jan. 26, 2010, pp. 1-10, website: http://javascript.crockford.com/jsmin2.php.txt.

(56) References Cited

OTHER PUBLICATIONS

Website: http://developer.yahoo.com/yui/, on Feb. 18, 2010, pp. 1-2.
Website: www.dojotoolkit.org, retrieved Feb. 22, 2010, p. 1.
Website: http://download.dojotoolkit.org/release-1.4.0/dojo.js.uncompressed.js.
Website: www.code.google.com/p/jqueiyjs/downloads/detail?name=jquery-1.3.2.js, retrieved Jan. 26, 2010.
Website: www.jquery.com, retrieved Jan. 26, 2010, pp. 1-2.
Website: www.magiq.com, retrieved Feb. 22, 2010, pp. 1.
International Search Report & Written Opinion from PCT Application No. PCT/US10/61997, mailed Mar. 3, 2001.
Final Office Action mailed Sep. 6, 2012, U.S. Appl. No. 12/685,268, filed Jan. 11, 2010, 21 pages.

* cited by examiner

```
<script>
(function (w) {
        w.tm2BootPosition = 0;
        w.tm2BootAsync = true;
        w.tmPageId = 1,
        w.tmParam = { param1: 'Value1',
                    PageCoded2: 'value2'
        };
        var conf = { host: 'pfa.levexis.com',
                    account: 'CLIENTNAME',
                    version: '3',
                    async: true,
                    cdn: (location.protocol === 'https:') ? 'sec.levexis.com' : 'res.levexis.com',
                    waitService: 'wt.tagman.com',
                    waitTest: true,
                    bootstrap: true,
                    param: w.tmParam || {} };
        // do not change values below this line
        function ap(sr , ol) {
           var e = document.createElement('script');
           e.src = sr;
           e.async = true;
           if (ol) {
                 e.onload = e.onerror = function() { if (!this.loaded) { ol(); this.loaded = true; } };
                 e.onreadystatechange = function() { if (this.readyState === 'complete' || this.readyState === 'loaded') {
this.onload(); } };
           }
           var s = document.getElementsByTagName('script')[0];
           s.parentNode.insertBefore( e , s);
        }
        w.TMAN = w.TMAN || {};
        w.TMAN.startTime = +new Date();
        w.TMAN.asyncLoader = function() {
           TMAN.addContainer( new TMAN.Container(conf.account, w.tmPageId, conf) );
        };
        var tm = '//' + conf.cdn + '/clientfiles/v' + conf.version + '/' + conf.account + '.js';
        if (conf.waitService && conf.waitTest) ap( '//' + conf.waitService + '/wait/0/' + Math.random() , function() {
TMAN.waitLatency=new Date() - TMAN.startTime; });
        if (conf.async) {
           w.TMAN.position = {};
           w.TMAN.doTags = function(p) { TMAN.currentPosition = p; };
           w.TMAN.addParam = function(n,v) {
                 w.tmParam[n]=v;
           };
           ap(tm);
        } else {
           document.write('<script src="' + tm + '"><\/script>');
        }
})(window);</script>
```

*Fig. 4A*

SYSTEM AND METHOD FOR LOADING OF WEB PAGE ASSETS

RELATED APPLICATIONS

This present application claims priority to U.S. Provisional Patent Application No. 61/537,001, entitled "SYSTEM AND METHOD FOR LOADING OF WEB PAGE ASSETS," filed Sep. 20, 2011, which is incorporated herein by reference for all purposes.

FIELD OF THE DISCLOSURE

This disclosure generally relates to systems and methods for online marketing and advertising. In particular, this disclosure relates to systems and methods for loading of web page assets.

BACKGROUND OF THE DISCLOSURE

Current web pages utilize a variety of HTML tags for purposes of ad serving and tracking user behavior. An example of an HTML tag is the iFrame container which is used by many ad servers to place ads within web pages. Many other tags exist and each has a specific purpose (e.g., digital marketing, display remarking, web page analysis). While HTML tags are necessary for many of today's websites, especially e-commerce sites, the main disadvantage of such tags is that they have the potential to drastically slow page load times which frustrates end users and leads to higher web page abandonment rates and thus potentially lower revenue for web page publishers. Further, web page publishers must implement a specific service provider's HTML tags within the publisher page. As more and more tags are included within the web page, the overall time required to fully load the page is increased, sometimes to unacceptable levels.

Some web page publishers try to mitigate this problem by placing vendor tags at the end of the web page code so that the tags load after the web page content. However, this method is problematic because placing tags at the end of a web page reduces the number of users still on the page at the point of the tag request, which correspondingly limits the tag's ability to gather data that is often very valuable to the web page publisher.

Webmasters and information technology experts work to maximize the efficiency of loading the content of web pages but often have no control over the tags necessary on their web pages. This causes undesirable page load delays and sometimes results in the removal of some tags to mitigate the overall effect.

Vendor tags may also present other risks to web page publishers. For example, JavaScript tags load sequentially which causes the browser to block all other execution of the page while it awaits completion of the script. Thus, if the awaited script never completes, it creates the worst-case scenario wherein the page never finishes loading.

Other solutions allow for tags to be loaded after the browser has marked its document object model (DOM) as complete. This method may present problems in that if a script loaded in this manner attempts to write content to the page itself (which has already been marked complete), then the browser will create a new page, effectively overwriting the intended page with a new, blank page. Therefore, a need exists in the art for a system and method that is capable of managing how and when certain tags load within a web page.

SUMMARY OF THE DISCLOSURE

In various aspects, the present application is directed to methods and systems for loading of web page assets. The above-described problems are addressed and a technical solution is achieved in the art by the systems and methods for loading of web page tags described herein. Embodiments of the present invention are directed to methods for coordinating the loading and management of web page tags using a single container tag and optional script tags which reference the tag management code placed on a publisher's page and an external tag management system. The external tag management system may be hosted by a third party.

In one aspect, the present disclosure describes a method for asynchronously loading tag management code and vendor tags on a web page while remaining portions of the web page load. The method may comprise receiving, by an application executing on a device, a web page comprising a configuration object configured to asynchronously load tag management code. The configuration object may load asynchronously, upon execution by the application, the tag management code into memory of the application while the application continues to load a remainder of the web page. The tag management code may request, while the application continues to load the remainder of the web page, one or more vendor tags from a server over a network. The tag management code may receive, while the application continues to load the remainder of the web page, a tracking tag from the server.

In some embodiments, the tag management code comprises a container tag. The configuration object may be placed on the web page to load the track management code at the beginning of loading the webpage. The configuration object may load the tag management code included in the configuration code. The configuration object may detect that an asynchronous property of the configuration object is enabled and responsive to the detection, the configuration object loads asynchronously the tag management code. The configuration object may request the one or more vendor tags while the tag management code loads asynchronously.

In certain embodiments, the tag management code may request asynchronously, the vendor tag comprising one or more scripts to be executed synchronously. The tag management code may receive asynchronously, the vendor tag comprising one or more scripts and loading the one or more scripts. The tracking tag may be cached for retrieval by a portion of the web page being loaded concurrently. The tracking tag loaded onto the web page may be triggered. The application may comprise a browser.

In one aspect, the present disclosure describes a system for asynchronously loading tag management code and vendor tags on a web page while remaining portions of the web page load. The system may include a configuration object configured to asynchronously load tag management code in an application of a device. The configuration object may, upon execution by the application, load asynchronously the tag management code into memory of the application while the application continues to load a remainder of the web page. The tag management code may, while the application continues to load the remainder of the web page, request one or more vendor tags from a server over a network. The tag management code may receive, while the application continues to load the remainder of the web page, a tracking tag from the server.

In some embodiments, the tag management code comprises a container tag. The configuration object may be placed on the web page to load the track management code at the beginning of loading the webpage. The configuration object may load the tag management code included in the configuration code. The configuration object may detect that an asynchronous property of the configuration object is enabled and responsive to the detection. The configuration object may load asynchronously the tag management code. The tag management code may request the one or more vendor tags while the tag management code loads asynchronously.

In certain embodiments, the tag management code requests a tracking tag comprising one or more scripts to be executed synchronously. The tag management code may receive a tracking tag comprising one or more scripts and loading the one or more scripts. The tracking tag may be cached for retrieval by a portion of the web page being loaded concurrently. The tag management code may load the tracking tag into memory of the application for the web page. The application may comprise a browser.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4A for an example of the tag management system container code illustrating one embodiment of how a container can be loaded asynchronously.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for a Tag Architecture;

Section C describes embodiments of systems and methods for loading of web page assets; and Section D describes embodiments of systems and methods for asynchronously loading tag management code and vendor tags on a web page while remaining portions of the web page load.

A. Computing and Network Environment

Figure 1A:
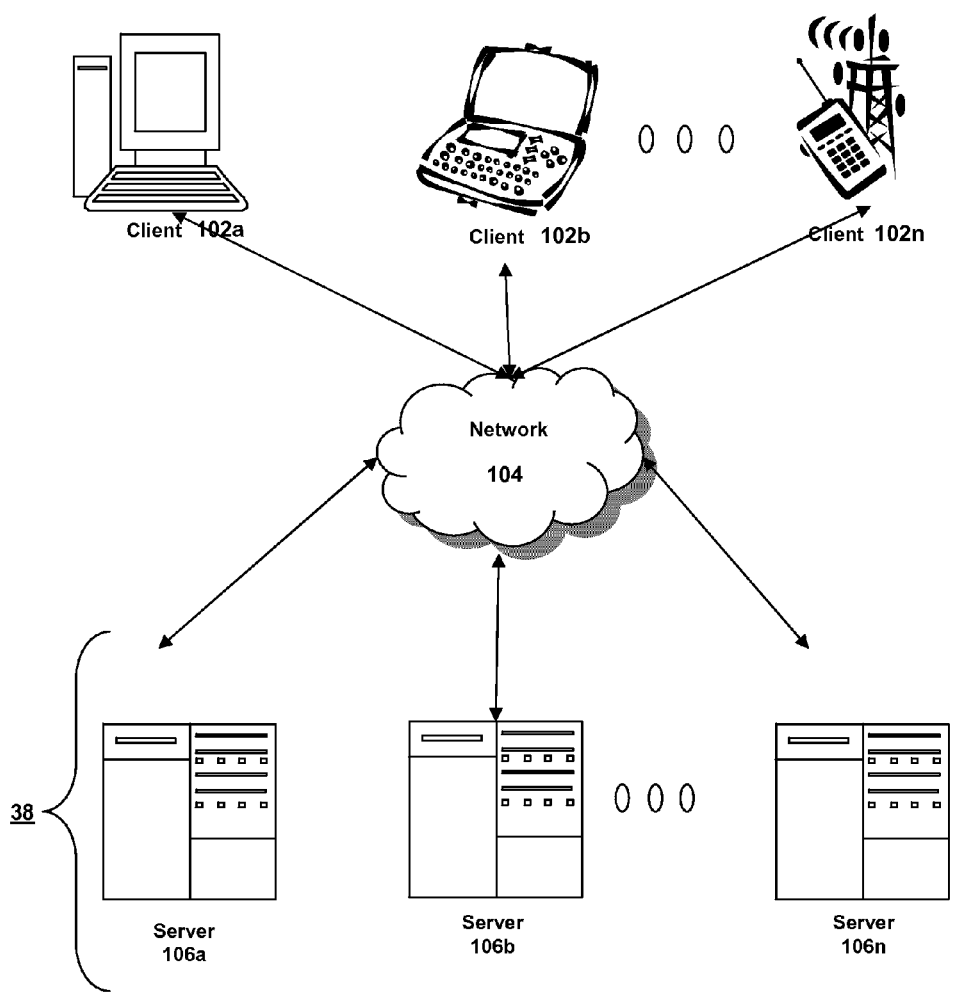
FIG. 1A is a block diagram depicting an embodiment of a network environment comprising client machines in communication with remote machines.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 102 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 102, forwards the requests to a second server 206b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

Figure 1B:
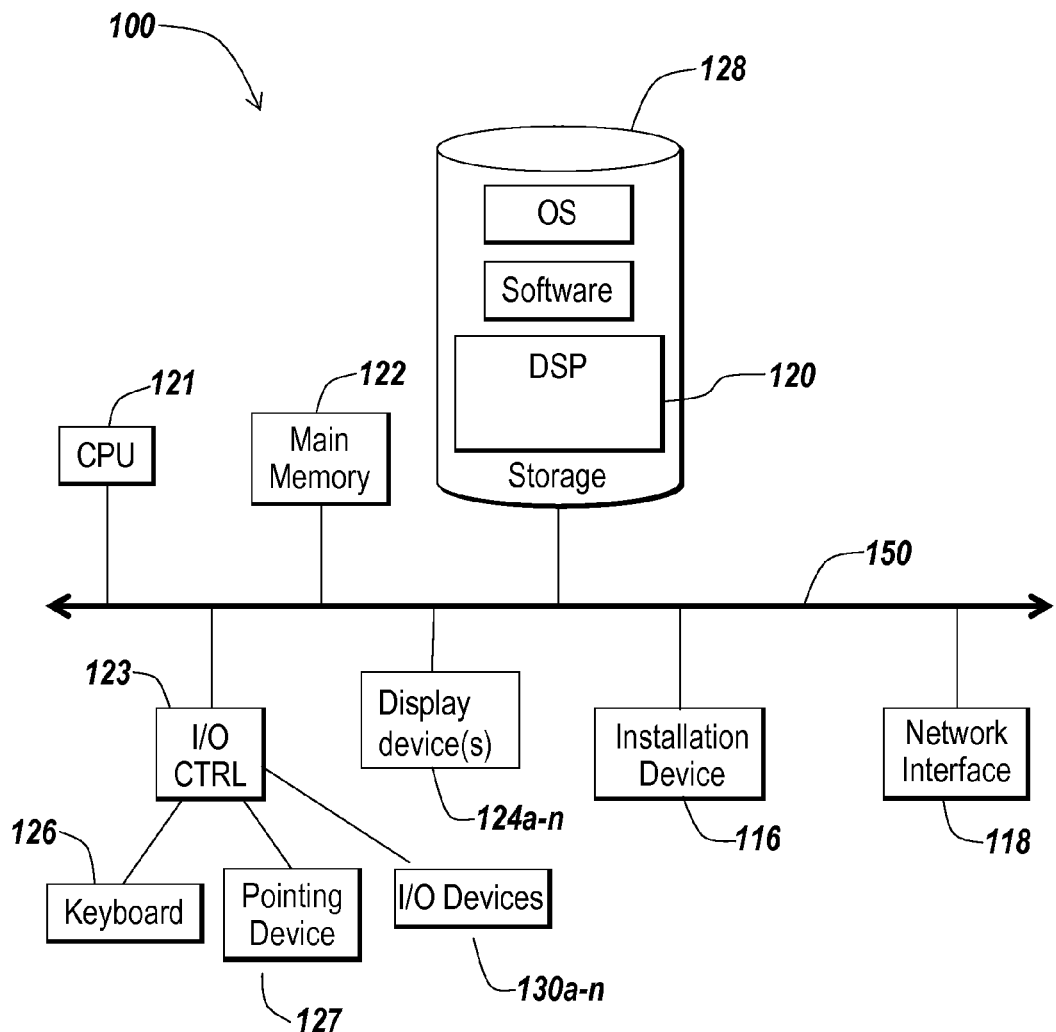
FIGS. 1B and 1C are block diagrams depicting embodiments of computing devices useful in connection with the methods and systems described herein.
Figure 1C:
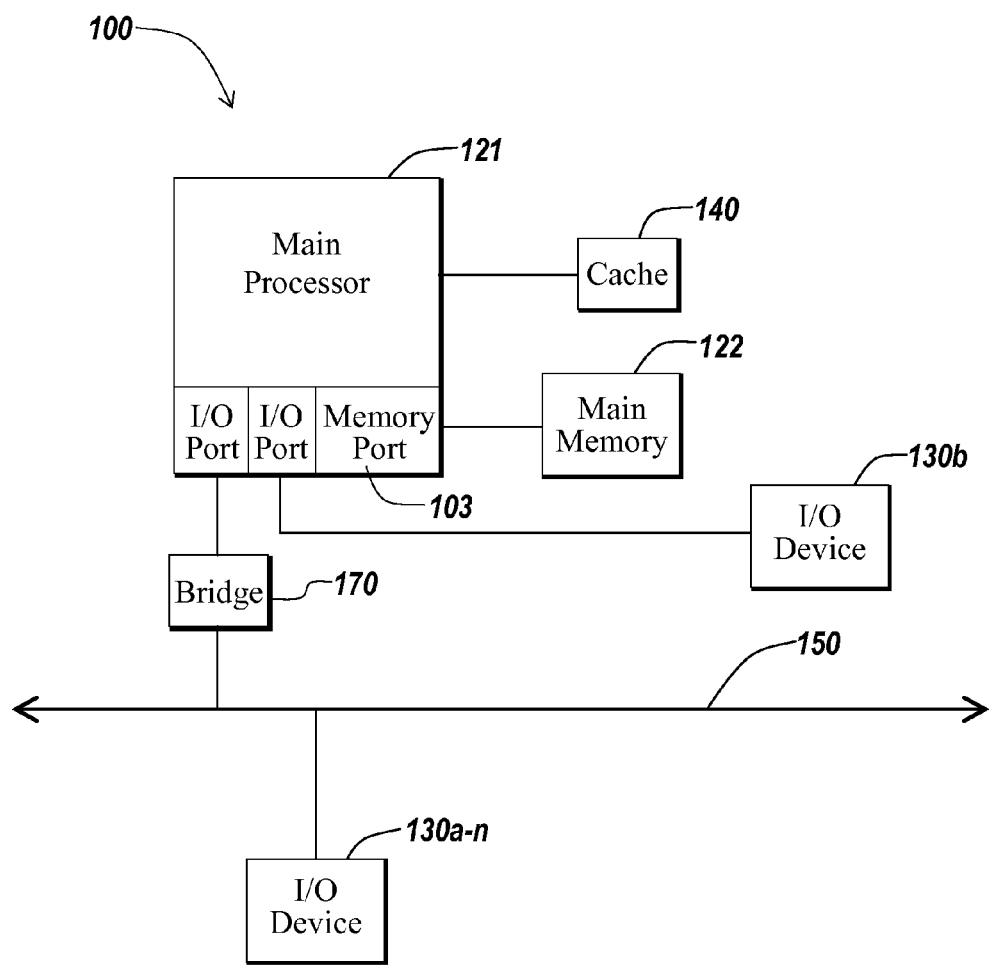

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a software of a demand side platform 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS XP, WINDOWS VISTA and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as the MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Tag Container Architecture

Prior to discussing specific embodiments of the present solution, it may be helpful to describe aspects of the Tag Container Architecture in connection with the methods and systems described herein. Various embodiments of the present methods and systems may provide a tag container architecture that can be used to replace and/or manage a plurality of tags and/or tag types. Upon incorporation onto a page, a tag container may provide rule customization (e.g., for one or more tags), and may do so without modifying web page or tag container hooking code on the web page. The tag container architecture may include three components or tiers: (1) config, which may provide parameters that indicate how a tag may integrate to a page, (2) template, which may include default or recommended tag properties, and (3) rules or transformers, which may be used to modify tag properties for various purposes. This architecture may allow rule customization, and may allow a tag management system to scale up in support of more and/or new tags, which may be from various vendors and/or of various types. In certain embodiments, the tag container may determine the context of each page load and may selectively activate/fire certain tags that the tag container manages. In doing so, the tag container may reduce page loading delays, e.g., due to the loading of a number of Iframes initiated by a plurality of disparate tags. The tag container(s) (e.g., in communication with a tag management system server) may track user behavior and may provide real time attribution to affiliates and/or partners of the website, e.g., responsive to a conversion.

In various embodiments, a tag container may comprise a mechanism to support and implement a plurality of heterogenous or disparate ad tags on a single web page. An ad tag may sometimes be referred to as a pixel, cookie or tracking code (hereafter sometimes generally referred to as "tag"). Ad tags may include HTML, JavaScript or other types of code that can be place on a site page in order to display ads and/or track user behavior. Ad tags may include information about a web site and/or types of ad units that may be displayed on a page. A network host may have control over the ad tags that are generated (e.g., using a Doubleclick Network Building (DNB)). The network host may be able to create custom ad tags for use on a publisher's site(s). The network host may share ad tag code with the publisher, and the publisher may insert the ad tag code into the publisher's site in order to display associated ads. In some embodiments, the network host may be an advertising vendor or partner.

There may be different types of ad tags that a network host or advertising partner can choose to create and share with a publisher or site owner. These include, without limitation, tag templates and dynamic tags. The network host may share one or more types of tags with a publisher. In the case of tag templates, a publisher can generate and/or retrieve ad tags based on tag templates that a network host has assigned or shared to the publisher's site(s). The network host can customize the tag templates with specific variables such as ad sizes, zone names, and key-value pairs. The information for each variable may be automatically included when a page load generates and/or retrieves one or more tags.

In some embodiments, a network host may provide dynamic tags. Dynamic tags may provide an alternative to using tag templates. The use of dynamic tags may allow a network host to make changes to ad tags on the back end (such as editing targeting information) without requiring a publisher to retag, e.g., replace or update a tag. Dynamic tags may be Javascript tags, and may wait for a page to load before capturing information from pre-defined variables or positions in the page. This captured information may then inserted into the third-party tags before these tags are written out into a page or Iframe. Thus, new information can be passed into tags without the web developer having to amend the HTML source code. If a page already contains ad tags created using tag templates, these tags may continue to work, even if they are on the same page as dynamic tags. However, if a publisher has ad tags that are not created using tag templates, the publisher may want to replace them with dynamic tags, e.g., so that changes can be automatically applied on the back end. When using dynamic tags, a publisher may add a header tag and a tag for each ad slot on a page.

In some embodiments, a tag container represents a single wedpage hook or container for one or more tags. The tag container may include tag management code that may be placed on a web page. The tag management code may be provided a tag management system hosted on a server (e.g., of a network host, publisher, partner or vendor). The tag container may include, appear as, or be represented by a single tag placed on a publisher's web page. The single tag can create calls to load any portion of a tag management framework and/or one or more tags.

Figure 2:
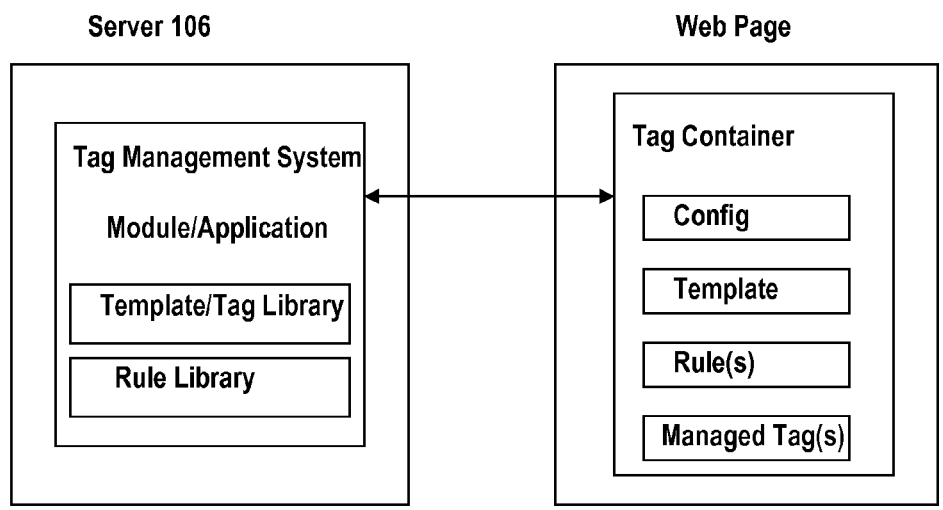
FIG. 2 is a block diagram depicting one embodiment of a system for tag management.

A tag management system (TMS) may be used to manage, control and/or coordinate analytics and the use and operation of a plurality of tags. These tags may be of different types and may serve different purposes. FIG. 2 depicts one embodiment of a TMS, including a tag container. In brief overview, the TMS may be hosted on a server 106, and may provide a tag container object for instantiation on one or more web pages. The TMS may include a template library and/or a rule library which may be referenced by each tag container instance. A TMS may sometimes be referred to as a tag server. A TMS can allow a publisher to manage and maintain tags from within a single application. A TMS can provide a consistent manner of controlling the data passed to third party marketing solutions, e.g., without requiring substantial IT effort and time. Marketing teams can use the TMS to turn around new marketing initiatives in shorter timeframes, and can set up business rules in the TMS to determine which tools are used to analyze and optimize the conversion of different customer segments that use the site.

A TMS can be used to enforce workflow and processes, and may lead to several benefits. Benefits may include, but is not limited to: (i) accuracy of overall analytics data; (ii) efficiency in adding tags at the right point in a development cycle; (iii) freedom of managing tags from one or more applications, flexibility in adding and testing new tags and/or reduced dependency on suppliers; (iv) ease-of-use and efficiency in tag management, offloading the amount of IT resources needed; (v) control of site compliance to technical best practices, privacy and/or other mandates; (vi) performance improvement in page load time, e.g., streamlining tags and serving tags only when appropriate.

In some embodiments, a TMS may provide accurate and/or real time attribution of an ad click and/or conversion to one or more affiliates or partners. TMS may do so via tag deployment using a tag container architecture. The TMS may identify and/or avoid duplication in attribution and may avoid duplicative or inaccurate payments to affiliates or partners. The TMS may optimize tag loads based on context (e.g., an associated user, search and/or page load). The TMS may optimize tag loads by selectively activating tags, which may be activated in a certain order to improve advertsing/marketing impact or reach. For example and in certain embodiments, a TMS may handle events and flash interactions to improve load speed and/or user experience. The TMS application/module may be designed and/or configured to run on any standard or custom hardware across one or more data centers. Data from tags, tag containers and/or data centers may be reported back to a TMS application in real time or near real time, e.g., via an n-tiered approach. In some embodiments, the TMS provide a single point to diagnose tag related performance issues, and may allow removal, modification and/or restoration of tags in connection with issue resolution.

In certain embodiments, a TMS may add, change and/or remove tags on production sites with proper validation. The TMS may enforce and structure a workflow around tag management that follows strict approval cycles, and may do so with a corresponding history log. The TMS may provide utilities to identify obsoleted and/or defective tags for unplugging or removal. The TMS, including the tag container architecture, may provide systematic and/or modular organization or separation of tag code, application code, and/or page code, so as to avoid errors and maintenance issues.

In some embodiments, a TMS may be hosted on one or more server(s) 106, client(s), appliance(s) and/or other network device(s). The TMS may be hosted on a hardware middle-tier, on-premise server and/or cloud-based service. The TMS may host any portion of a tag management framework, such as templates and/or libraries linked to a tag container or tag. The TMS may generate, publish, share, distribute, assign or otherwise provide tag container code to a publisher or a publisher's site. The tag container code may be incorporated or hooked to a page, which may be substantially similar to how a tag may be incorporated onto a page. In certain embodiments, the tag container may be placed before the closing body tag of a page. The tag container may be placed immediately before the closing body tag, for example, to improve the level of learning and/or tracking for an online campaign. In some embodiments, it may not be recommended to place a tag container before the opening body tag or after the closing body tag. In certain embodiments, (e.g., if the page is using frames and/or all pages are running under the same URL), the tag container may be inserted into the code of individual pages to be tagged that fill a main frame.

Referring again to FIG. 2, the TMS may include a Javascript library, and tag container code that may be inserted in each page. The library may be standardized and shared across clients so that users may download it once per session. When the page is loaded, an initial call to the TMS may retrieve parameter requirements. The TMS may wait for the page to complete loading before continuing. Tags may be written out (e.g., by the browser or page load based) into an Iframe, along with the flash pixel. One advantage of writing tags out into an Iframe may be that the written Iframe does not delay the page from completing. If the business logic configured in the TMS dictates that no 3rd party tags are to be served, minimal code may be sent back to the page, keeping bandwidth to a minimum and reducing the impact on page download speed.

The TMS may provide and/or support a number of types of tag containers. The types of tag container may include but are not limited to the following: (i) Dynamic Javascript containers may be used to dynamically collect data from pages and/or to deploy solutions that need to run directly in the page; (ii) static Iframe tags may offer somewhat limited functionality (e.g., in relation to one or more other types) but can allay certain security concerns; (iii) static GIFs can be used to serve one tag per page, and may offer improved security; and (iv) redirect tags, which may be used to track exit pages and/or download links Static Iframe tags and static GIF tags may not use Javascript.

In certain embodiments, a single tag container may replace all or a number of tracking pixels on an advertiser web page used to track, for example, natural search, paid search, affiliates, display, email or site analytics. A tag template or container may be delivered via a CDN to a client, e.g., to a client's web browser. The replaced tags may be housed, linked or referenced from within the tag container, and may be managed through a browser-base interface for example. Thus, tags from multiple channels can sit on or be managed by one system. The use of tag container(s) can be used to track activities to see the entire path to conversion (e.g., including keywords used in a search) that a user follows when taking action on one or more websites. In some embodiments, a tag container's JavaScript or code holds the tags that a publisher wants to deploy to the publisher's website. The tag container may select (e.g., in the browser) which tags to execute, for example, based on embedded or linked conditions. A TMS may operate in a client/server model where a tag container's JavaScript may ask a tag server or TMS host server which tags should be activated on a given page for a given user under defined conditions. In this model, such conditional decisions may be made on the TMS's server.

In some embodiments, a tag container, or each instance of a tag container, may include three layers, tiers or components, although not limited to these: a) Template, b) Config, and c) Rules. This architecture can provide flexibility, efficiency and scalability, e.g., allow rule customization while maintaining the rest of template and config intact, allows deployment of changes in the field to tag containers by changing the configuration or rules without changing the web page or tag container hooking code in web page, and allow scalability to take on additional and more tags from different vendors. The config component may determine or indicate how a tag integrates to the page, and may set parameters required by the tag. The template component may comprise a core tag template that may not change. In certain embodiments, such as in the TAGMAN TMS solution, the template refers to a TMAN.Tag or TAGMAN.Tag statement with default (e.g., recommended) tag properties. The transformers or rules component may be used to modify tag properties for a variety of purposes, e.g., for tuning site performance and/or adding targeting to when the tags are included. Transformers may apply the business rules of the TMS, which may correspond to a vendor, partner and/or campaign. The transformation or customization of a tag template may occur in-browser, at the client-side.

In some embodiments, the config component or tier is applied followed by the transformers or rules component. Both of these components may be applied before steps such as preloading and/or caching steps (e.g., initiated by doTags runs). In some embodiments, when applied, a tag container may appear like a tag with parameters and business logic hard coded into the tag. In various embodiments, the tag config may include a mapping of parameters to tags. The config may assign particular parameters to a specific tag or group/subset of tags. The config may assign particular tags to a specific parameters or group/subset of parameters. When creating the tag config, one may either select defined parameters (e.g., from a drop down menu of an interface of the TMS) or add text parameters for hardcoded values such as account id, etc. In some embodiments, a config object may be defined in JavaScript Object Notation (JSON) or another format, and may include static parameters (e.g., for hardcoded values) and/or mapped parameters (e.g., for parameters being used from the container, for any container type).

In some embodiments, the template component is a core portion of a tag container (e.g., TMAN.Tag) that is maintained within a tag library. The tag library may be maintained by vendors, partners, publishers, network hosts and/or other entities. The template component may include default or recommended properties (e.g., indicate if a tag is async or sync, in loading manner, etc, specify a position to execute a tag at, etc).

In some embodiments, the rules or transformers component of a tag container may be used to modify one or more tag properties. The rules or transformers component may be used to modify one or more tag properties of a specific tag or group of tags. The rules or transformers component may include a plurality of rules, policies and/or parameter/tag modifiers (hereafter sometimes generally referred to as "rules" or "transformers"). One or more rules can be used to change how a tag is loaded by a corresponding tag container (e.g., which smart loading features to use) and/or business logic that determines if a tag should be loaded at all.

In certain embodiments, a publisher or a network host may insert a tag container onto a web page. A tag management system (e.g., of a host network, vendor or partner) may generate and/or provide the tag container to the publisher. The publisher may instantiate the tag container onto one or more web pages. The tag container instantiation may link to one or more libraries (e.g., template and/or rule libraries) hosted on a server 106. The publisher may hook or incorporate code of the tag container onto a web page. In some embodiments, the tag container code is inserted before (e.g., immediately before) a closing body tag of the web page. In other embodiments, the tag container code is inserted elsewhere in the web page.

The tag container may comprise a config, template and rule component, for example as discussed above in connection with FIG. 2. The web browser, TMS and/or publisher may assemble a tag container from its components (e.g., config, template and rules), for example, by identifying a template library, template identifier, client-specific rules, and/or by specifying one or more tag-specific parameters. The publisher may specify client-specific and/or custom rules and/or parameters for one or more tags in the container.

The tag container may manage a plurality of tags, e.g., tags of various types, from various vendors, and for different purposes. The publisher or TMS may remove existing tags on a page, or replace existing tags with the tag container. The tag container may hold or manage the existing tags within the tag container. The publisher, vendors and/or partners may add new tags to the tag container. The tag container may include conditions for activating each of the tags, e.g., based on a context of the page load, the user, geo data, etc. The tag container may determine the sequence in which the tags are activated.

In some embodiments, the tag container may support asynchronous and/or synchronous modes during loading. A main script may appear before the <head> tag (e.g., to illustrate an early point of implementation). <div> and/or <script> tag locations may appear at one or more locations, e.g., throughout the page. The tag container code may place tags in designated locations within the page, and may provide support for multi-part tags. One illustrative embodiment of a tag container is depicted below:

```
<script>
(function (w) {
    w.tm2BootPosition = 0;
    w.tm2BootAsync = true;
    w.tmPageId = 1,
    w.tmParam = { param1: 'Value1',
        PageCoded2: 'value2'
    };
    var conf = { host: 'pfa.levexis.com',
        account: 'CLIENTNAME',
        version: '3',
        async: true,
        cdn: (location.protocol === 'https:') ? 'sec.levexis.com' : 'res.levexis.com',
        waitService: 'wt.tagman.com',
        waitTest: false,
        bootstrap: true,
        param: w.tmParam || { } };
    // do not change values below this line
    function ap(sr , ol) {
        var e = document.createElement('script');
        e.src = sr;
        e.async = true;
        if (ol) {
            e.onload = e.onerror = function( ) { if (!this.loaded) { ol( );
this.loaded = true; } };
            e.onreadystatechange = function( ) { if (this.readyState ===
'complete' || this.readyState === 'loaded') { this.onload( ); } };
        }
        var s = document.getElementsByTagName('script')[0];
        s.parentNode.insertBefore( e , s);
    }
    w.TMAN = w.TMAN || { };
    w.TMAN.startTime = +new Date( );
    w.TMAN.asyncLoader = function( ) {
        TMAN.addContainer( new TMAN.Container(conf.account, w.tmPageId,
conf) );
    };
    var tm = '//' + conf.cdn + '/clientfiles/v' + conf.version + '/' +
conf.account + '.js';
    if (conf.waitService && conf.waitTest) ap ( '//' + conf.waitService +
'/wait/0/' + Math.random( ) , function( ) { TMAN.waitLatency=new Date( ) –
TMAN.startTime; } );
    if (conf.async) {
        w.TMAN.position = { };
        w.TMAN.doTags = function(p) { TMAN.currentPosition = p; };
        w.TMAN.addParam = function(n, v) {
            w.tmParam[n]=v;
        };
        ap(tm);
    } else {
        document.write('<script src="' + tm + '"><\/script>');
    }
})(window);</script>
```

In some embodiment, a first portion of the tag Container Tag may include configuration of how the container behaves. This portion may be include lines prior to "// do not change values below this line". Tag containers may be configured through a user interface of the TMS. A tag container may be initialized using configuration parameters in the first portion. Client and/or page-specific parameters may be defined in the w.tmParam object. When the tag container is initialized, it may be passed a client's schema name, which may replace the CLIENTNAME placeholder in the example. It may also be passed a tmPageId variable and/or a configuration object, that may specify how the container behaves.

In some embodiments, one implementation location for the tag container is at the top of the <head> section of the page. In other embodiments, the container can be loaded at various other locations in the page. Position specific tag calls may be added to a page. In certain embodiments, the tag container allows definition of additional positions within the <BODY> of a page. These positions may be defined by inserting a block of code into the target position of the page.

In certain embodiments, one or more tag containers may reside on a page. For example, the "account" parameter may be uniquely specified for each of such containers. The TMS can be configured to serve one or more tag containers from within a tag container. In some such embodiments, the "child" tag container may inherit options/parameters from a "parent" tag container.

C. Systems and Methods for Loading of Web Page Assets

For purposes of this disclosure, terms are to be given their plain and ordinary meaning in the context in which they arise as understood by those possessing ordinary skill in the art. As used herein, the term "asset" is intended to include images, JavaScript or other scripts, iframes, vendor tags, or other elements that are needed for the rendering or function of a web page.

According to an embodiment of the present invention, a single tag is placed on a publisher web page. This single tag creates calls to load the tag management framework which can be referenced and used at later points in the web page to load tags according to the system configuration. Refer to FIG. 2 for a diagram of the high-level HTTP request flow between a user's web browser and the various servers involved in the delivery of the web page.

Use of a Time Blocking Asset to Control Web Page Loading

As executed by current web browsers, JavaScript is inherently single-threaded. This means that while a process is running, no other processes can be executing at the same time. Consequently, when trying to control any problem using JavaScript, one must consider the fact that when you relinquish control over the process, you cannot guarantee if or when it will get returned to your code.

According to an embodiment of the present invention, a synchronous, timed request is made via the system to a wait service. The purpose of the wait service is to provide a mechanism by which a piece of JavaScript code (namely, the tag management framework) can maintain control over the JavaScript thread and create a controllable delay in the page, only long enough that any required assets are ready to be delivered at the required point. This enables the code to ensure that assets are not executed before they are ready, nor executed past the asset's designated location or technical limitation of the DOM complete event. According to an embodiment of the present invention, the wait service is hosted on an external server and will execute (server-side) the timed delay specified in the HTTP request to the service. By causing the browser to wait for this synchronous script call, the tag management framework and wait service are able to provide the necessary delay for a tag to complete loading, while maintaining control over the JavaScript thread and maintaining the position for execution within the web page. If, after the wait service call, the tag is still not finished loading, an additional call to the wait service can automatically be made via the same mechanism.

Encapsulation of JavaScript Dependencies to Improve Page Performance

Some assets have multiple components which are required for their proper execution. Often, these components contain dependencies whereby a later component requires the existence of a prior one before it can execute. This means that the dependent components must wait for as long as necessary until the prerequisite components fully load. This waiting can cause delays in both tag and page load time.

According to an embodiment of the present invention, the system allows for 3rd-party tags to define dependencies in their assets, via the tag wrapper, which allow the framework to optimize the load times of each component, thereby reducing or eliminating wait times for depending components. This results in an overall reduction in tag and page load time.

By way of example and not limitation, consider the case where a vendor tag consists of two JavaScript files, the first of which is a library of JavaScript functions and the second of which utilizes these functions to perform its intended action. When entered into the tag management system, it can be specified in the tag wrapper that this tag contains the prerequisite script file containing the library of functions, without which the execution of the tag cannot function. When this script is identified to the tag management system in this way, the system will attempt to load this necessary script ahead of time, so that at the time of execution, the tag does not need to wait to load the library script.

Assume that the initial library script takes 250 ms to respond and load following the applicable HTTP request. The load time of the second script is irrelevant to the page load time benefit. Assume further that other content to be loaded into the page will take 500 ms of time before this tag is executed.

By preloading the prerequisite assets, the overall time it takes to load the complete page can be reduced by the load time of those assets, assuming that the other page components take that long to load in parallel prior to the location at which the tag needs to be executed. FIG. 3C provides a visualization of the above example, where the grey bar represents the load process of the page.

When it is detected that an asset has an internal dependency, as specified by the tag wrapper code, between its components, the system will begin the following process to eliminate unnecessary wait times:

1. Make a brief call (a few milliseconds) to the wait service to ensure that the wait service is properly responding and to cache a small JavaScript file on the web browser client.
2. Make a second call to the wait service which detects whether the browser was set to allow caching of objects (checking for the existence of the previously cached item). This is necessary to ensure that pre-loaded items will successfully remain in the browser cache. This check is necessary because if the browser does not cache objects, then any pre-loaded items will not be kept and will have to be loaded a second time (when actually needed), resulting in additional waiting time.
3. Prerequisite assets (e.g. JavaScript scripts) are pre-loaded in a manner such that they can be loaded in the background without blocking page execution and can be cached for immediate retrieval when needed later in the page load process.

Upon reaching the point in the page at which the multi-component asset is set to be delivered, the specified prerequisite assets are recalled from the browser cache and made immediately available to the browser, eliminating wait time. Because the assets were originally loaded in parallel with the rest of the page (as opposed to causing the page to wait), the waiting required to accommodate the load time of the prerequisite asset can be almost entirely eliminated.

Dynamic Termination of Asset Loading

To address the hazard of slow-loading 3rd-party assets affecting the user experience by causing unacceptable page load delays (or worst-case, causing the page to stop entirely while awaiting an unresponsive server), embodiments of the present invention allow for the user-specification (by the web page publisher) of a timed threshold at which an asset load will be terminated. This process is referred to herein as "tag killing." This threshold can be specified as a finely granular (millisecond) time limit, and can be applied to a "tag" (one 3rd-party HTML tag or code block), a "container" (the entirety of the assets delivered through the tag management system within one page load), or the web page itself. All attempts to abort or prevent loading of assets are subject to limitations of particular browsers, and in some cases may not be possible.

This capability allows for risk management over the single point of failure represented by any blocking request (e.g. JavaScript load) to a single server. By using this feature, even a non-responsive server can delay a page for only as long as the webmaster or marketer has allowed.

When the aforementioned blocking-time tag killing threshold is defined for a tag, the threshold value becomes the enforced limit of total blocking time allowed for this tag before its loading is terminated (aborted). Blocking time, in this context, is defined as the amount of time that a tag blocks the page after the page has reached the tag's specified point of delivery but the tag's pre-loading resources have not yet been fully retrieved.

Tag killing thresholds can be defined at a container level. When defined, the container will compare the specified threshold to the aggregate tag blocking time (as defined for individual tag blocking) of all tags being delivered through this single container. If the timeout applying to a container is reached, then all currently loading and not yet loaded tags will be aborted or prevented from loading for this page request.

If the page timeout (as specified on a tag-by-tag basis within each tag) is reached, then the tag(s) in question will be aborted or prevented from loading for this page request. This allows control over content delivered through the tag management system based on the overall page performance, even for items outside of the tag management framework.

Loading of Synchronous Scripts Through an Asynchronously Loading Framework

Figure 3A:
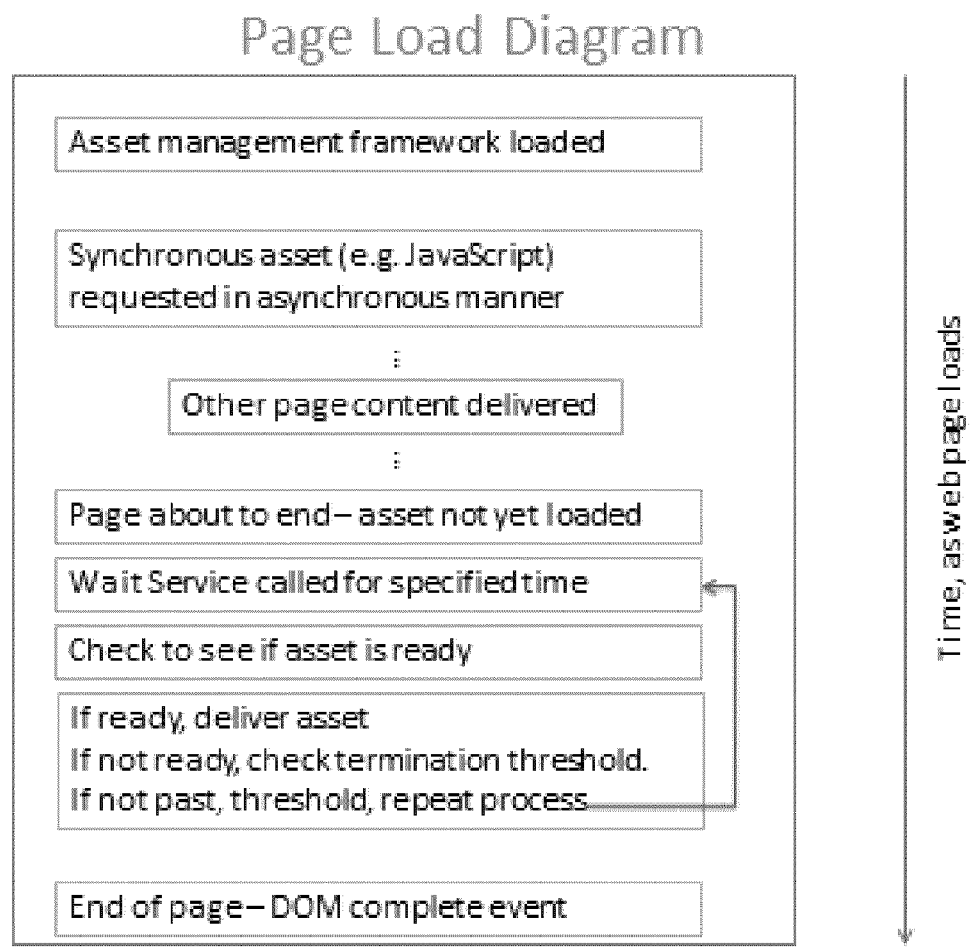
FIG. 3A is a block diagram depicting one embodiment of a flow diagram for delivering synchronous 3rd-party tags through an asynchronously loaded framework.
Figure 3B:
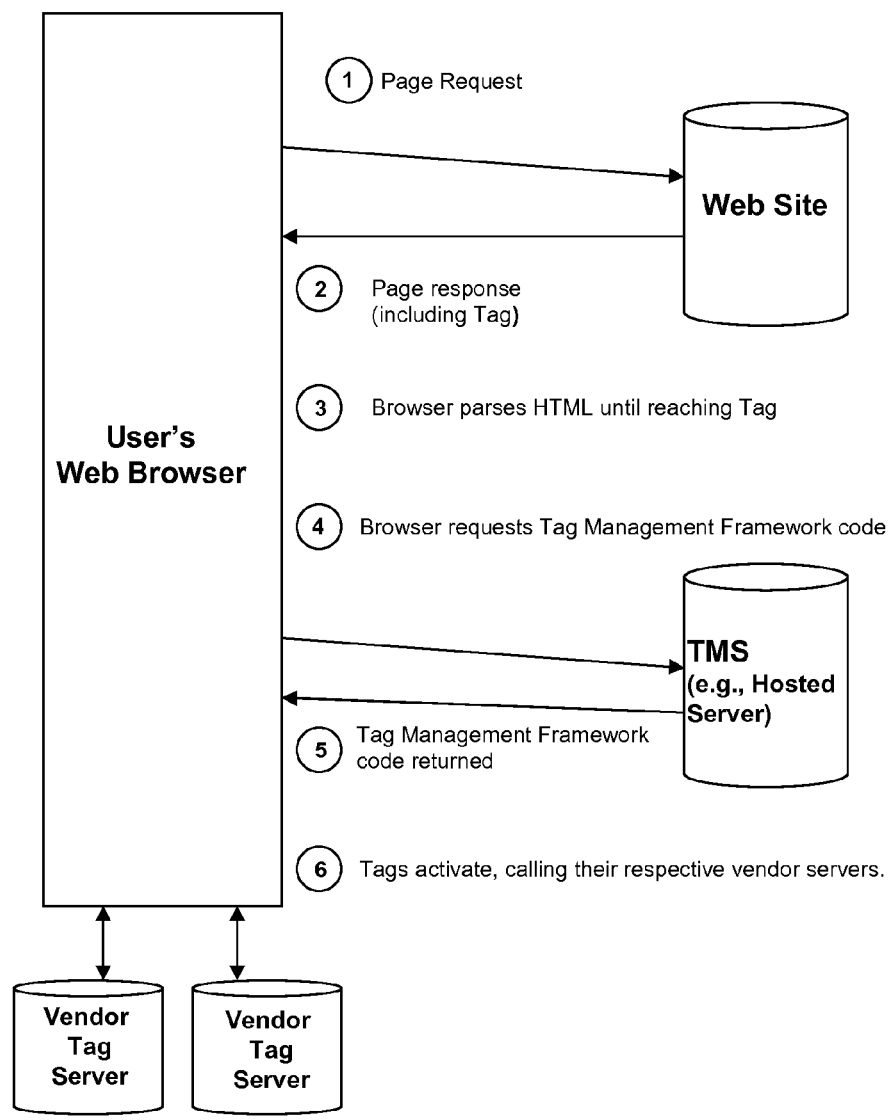
FIG. 3B is a block diagram depicting one embodiment of a flow diagram for transactions related to a page load and tag activation.
Figure 3C:
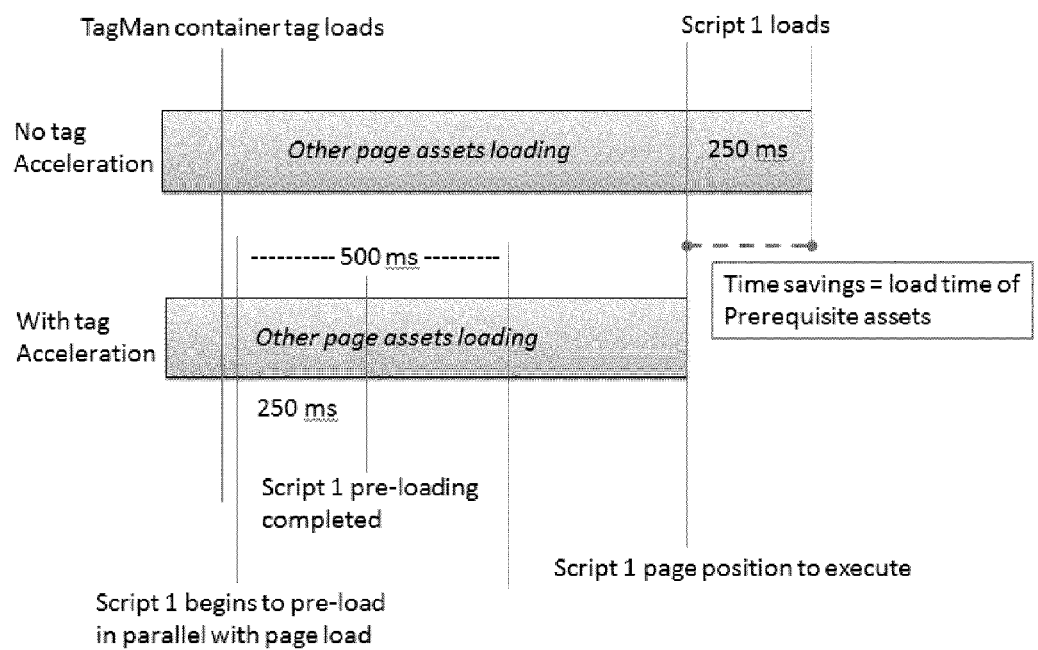
FIG. 3C is a timing diagram depicting one embodiment of a load process of a page.

According to an embodiment of the present disclosure, and referring to FIG. 3A, the system is capable of delivering synchronous 3rd-party tags through an asynchronously loaded framework. The asset management framework is first loaded at the point where the tag management system container tag is implemented. Multiple synchronous assets (e.g., JavaScript tags) may then be requested by the system in an asynchronous manner. During this process, other page content may be delivered simultaneously. If a synchronous asset has not yet been loaded, the system makes a call to the wait service which causes the page load to wait for a specified period of time. If the synchronous asset successfully loads then the browser marks the DOM as complete. If the synchronous asset has not fully loaded during the specified wait time, the system checks if the termination threshold has been met. If the termination threshold has not yet been met, the system continues waiting for the synchronous asset to load and repeats the process. However, if the termination threshold has been met, the system aborts loading the specified synchronous asset and the browser marks the DOM as complete.

D. Systems and Methods for Asynchronously Loading Tag Management Code and Tracking Tags on a Web Page while Remaining Portions of the Web Page Load According to some embodiments of the present disclosure, the tag management system is configurable such that the tag management system itself may be loaded asynchronously into the page. See FIG. 4A for an example of the tag management system container code illustrating how the container can be loaded asynchronously. Specifically, when the "async" property of the "conf" object is set to true, the container can load itself (i.e. the tag management framework) asynchronously. This can allow the tag management framework to be loaded in a non-blocking manner which allows the rest of the page to continue loading in parallel. One benefit of this may include an ability to load the tag management system as early in the page as possible so that tags can be delivered early in the page, and the full benefit of the tag management system's page load optimization features can be realized.

Figure 4B:
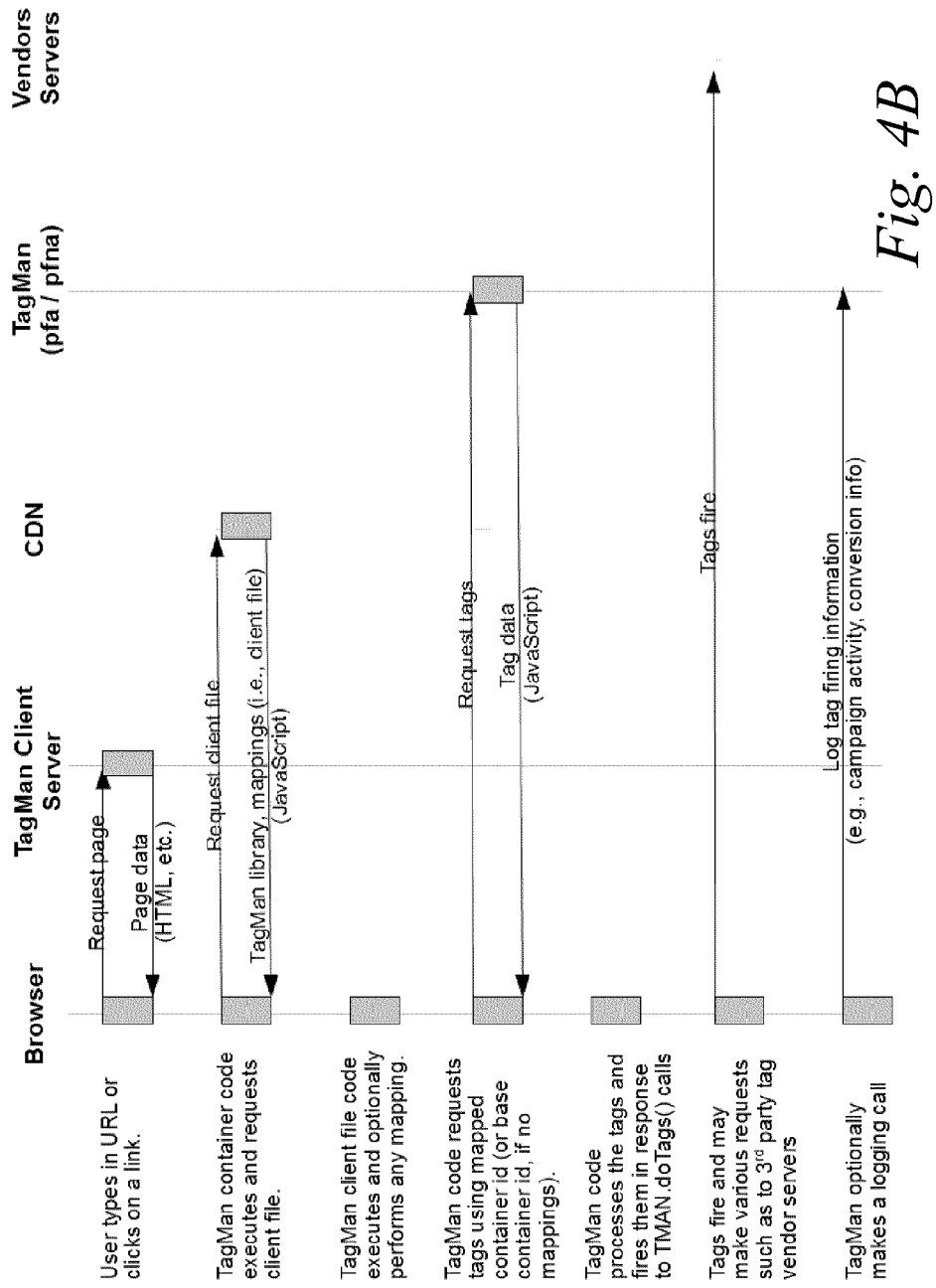
FIG. 4B is a graphical representation of tag management in a process flow of a web page.
Figure 4C:
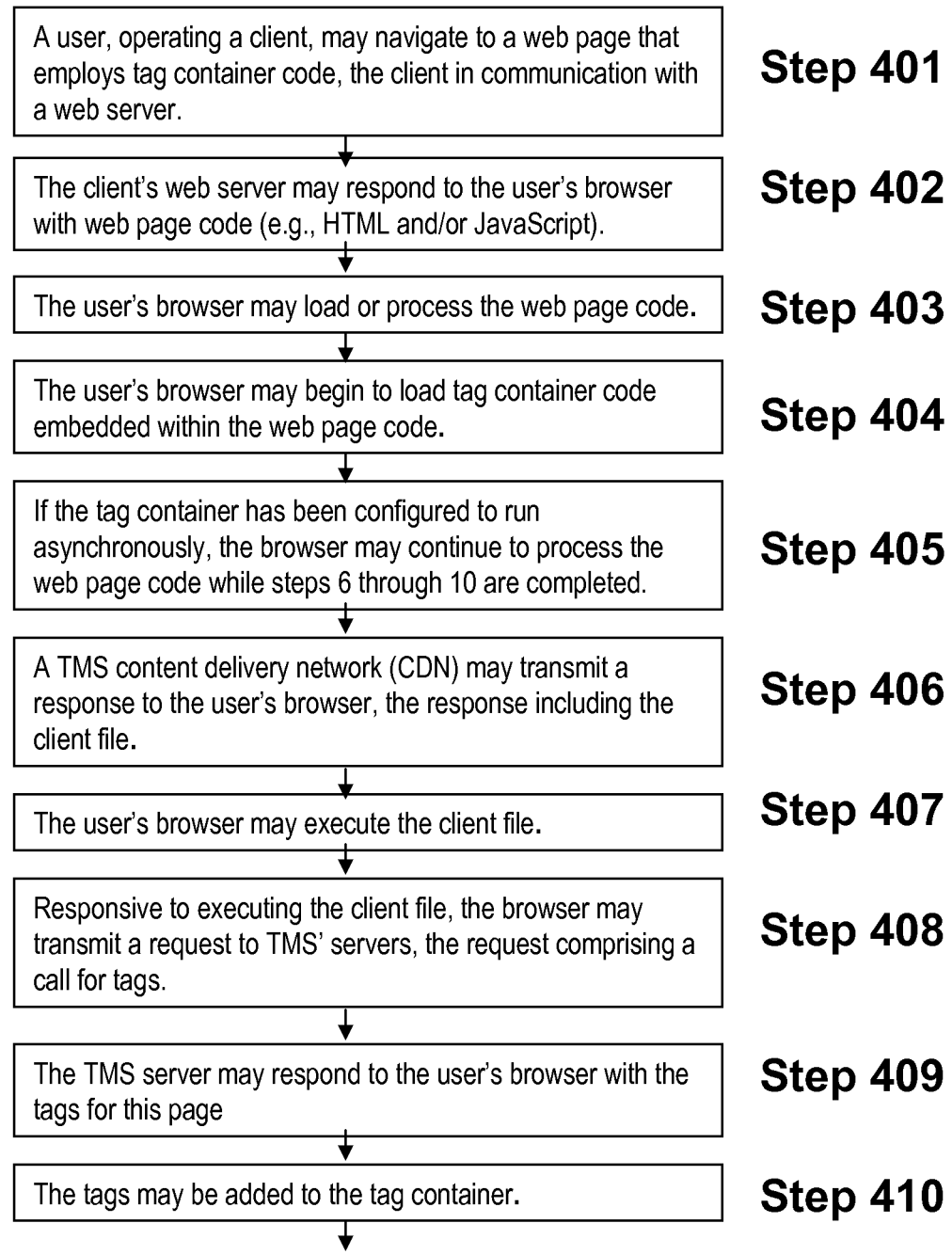
FIGS. 4C and 4D include a flow diagram depicting one embodiment of a method for asynchronously loading tag management code and vendor tags on a web page while loading remaining portions of the web page.
Figure 4D:
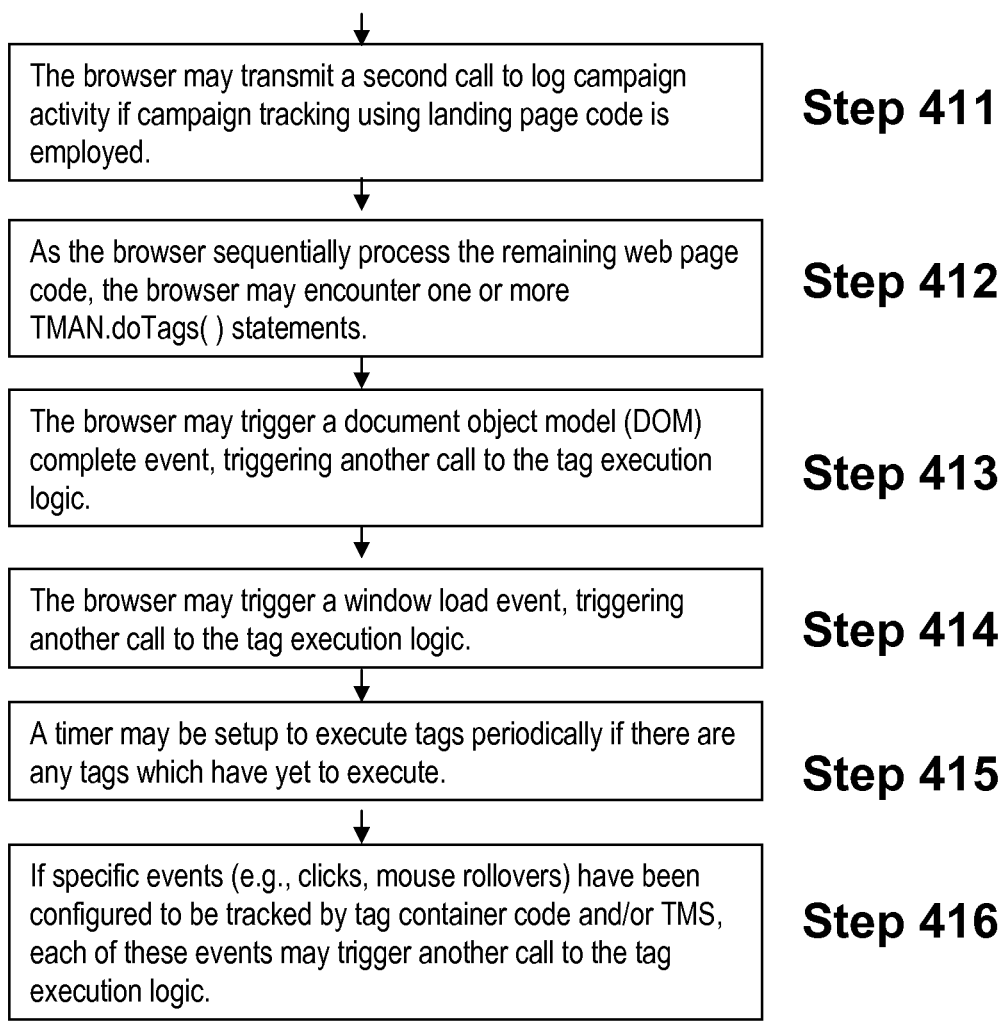

Referring to FIG. 4B, one embodiment of graphical representation of a tag management process flow in connection with the loading of a web page is depicted. The process flow may illustrate, at a high-level, how tag container code can operate and/or fit into the dynamic construction and process flow of a web page load, e.g., from an initial call to a web page that employs tag container code, to the execution of a vendor or managed tag. The process flow may identify or describe various network calls and processing done by tag container code on a web page.

In some embodiments, (e.g., step 401) an end-user or user may navigate to, or may be presented with a web page that employs tag container code (e.g., TagMan's technology). The web page may be referred to as TagMan or tag management system (TMS) client's web page. For example and in one embodiment, the user may navigate to the web page by typing in the web site's address, or clicking on a link to the web site. In certain embodiments, the user may be brought to a web page, such as a confirmation page, after making a purchase or some other online transaction. The TMS client's web server may respond to the user's browser with HTML and/or JavaScript, e.g., web page code (e.g., in step 402). The user's browser (or some other web-page rendering or loading application) may process the web page (e.g., in step 403). By way of illustration, some of the steps described herein may refer to a browser as an application supported by the methods and systems described herein. This browser may sequentially read through lines of HTML and/or JavaScript as it loads the web page.

The user's browser may reach and/or begin to load tag container code inserted or embedded into the web page code (e.g., in step 404). Tag container code may comprise code that a TMS provides to TMS clients to place on their web page(s). A tag container (or tag container object) may comprise a JavaScript object to which tags are added. A tag container may include, for example, a base container, a mapped container, etc. When the browser loads the tag container code, the tag container code may cause the browser to make a request to the TMS' content delivery network (CDN), for example, res.levexis.com. This may be referred to as a call for the TMS JavaScript "library" file, which may be referred to or also known as a "mappings" file. The TMS library or mappings file may include a framework of how to execute tags, as well as optional mappings information. In some typical embodiments, the TMS library or mappings file may not include or contain the tags themselves.

A TMS library or mappings file may sometimes be referred to as a client file. Mappings may be determined based on data elements of the current page (e.g., the URL). When a mapping criterion is met, the TMS may determine or know which tags to send, via a mapped container, to the current page. If a client has chosen to not use mappings or if no mapping criterion is met, TMS may send one or more tags associated with the base container. Base containers (as well as mapped containers) may be set up during the client configuration process. The calls/requests to the TMS' CDN in step 404 (and to the servers in steps 408 and 411 discussed below), the campaign activity and conversion related info noted in step 411, and/or the user interaction events noted in step 416, may be logged to TMS' servers.

In certain embodiments, the tag container code is placed or located at or near the top of the web page. The tag container code may be configured to run asynchronously (e.g., the browser can load, render, process and/or parse the rest of the page while the container calls finish executing or running (e.g., the browser does not have to wait for the container code to finish executing, as it would if the container was configured to run synchronously). For tags to execute, one or more of the following conditions may be required: (i) the container code has executed, (ii) the client file has loaded, and (iii) the first pfa/pfna call (e.g., step 408) has completed (e.g., its response has loaded). For example, if a tag or statement to implement or execute a tag is encountered before these conditions are met, no tags may begin execution at that time.

If (e.g., in step 405) the TMS container has been configured to run synchronously (e.g., via a setting for making the container code calls), the browser may wait at this point and not continue to process the remaining web page code until steps 6 through 10 have been completed. If the container is asynchronous, the browser may not have to wait. The browser may continue to process the web page while steps 6 through 10 are completed.

The TMS CDN may respond back to user's browser with the client file (e.g., in step 406). The user's browser may run or execute the client file (e.g., in step 407). In some embodiments, (e.g., in step 408) running the client file may cause the browser to make a request to TMS' servers (e.g., pfna.levexis.com for North America, pfa.levexis.com for some other regions). For the request, the browser may use the mapped container id if a mapping criterion was met, or the browser may use the base container id. This request may comprise a call for the TMS tags. The pfa/pfna call may read a corresponding campaign history from the user's cookie and may optionally apply business logic to serve tags based on the campaign history. This method of serving tags may be in addition to the method of serving tags based on mappings rules, referenced in step 4.

The TMS server may respond to the user's browser with the tags for this page (e.g., in step 409). The tags may be added to the tag container (e.g., in step 410). The tags may be not visible to the user. For asynchronous containers, tags may be executed up through the doTags( ) position most recently encountered by the browser (e.g., which is variable depending on a number of factors). Some factors may include: the speed of user's computer and internet connection, the complexity of the page itself in terms of length (e.g., in bytes) and number of elements, such as images and advertisements. The more elements the browser needs to download and process in order to render the page, the more time it may take for the browser to encounter each doTags( )) call on the page. The tag execution may follow logic associated with the doTags ( ) function. The doTags( )) function may cause the tag container to perform its tag execution logic. This logic may check to execute any tags designated to run at a current position in the page, or at one or more previous positions at which tags were unable to fire earlier and are "moveable" (e.g., a property of a tag that allows the tag to be fired at subsequent positions in the page). The current position may be passed as a variable into the doTags( )) function. For synchronous containers, no tags may be executed at this point because the browser has been blocked.

In some circumstances, a second pfa/pfna call is made (e.g., in step 411) to log campaign activity if campaign tracking using landing page code is employed (e.g., to log a click). Impressions may also be logged using a pfa/pfna call (e.g., made by a view tracker tag or pixel). This call may update the campaign history in the user's cookie. For conversion pages, requests may be logged (e.g., line by line) with info about the conversion. These requests may be logged with the campaign history from the user's cookie that led to the conversion.

As the browser continues to sequentially read or process the remaining HTML and JavaScript on the web page, the browser may encounter one or more TMAN.doTags( ) statements (e.g., step 412). Each of these statements may call the TagMan doTags( )) function. The browser may trigger or execute a document object model (DOM) complete event, triggering another call to the tag execution logic (e.g., in step 413). The browser may trigger or execute a window load event, triggering another call to the tag execution logic (e.g., in step 414).

When a window.onload event is triggered or executes, a timer may be setup to call doTags(DOTAGS_TIMER) for a predetermined time period and frequency, such as every 10 seconds for 30 seconds, if there are any tags which have yet to execute (e.g., step 415). Tags targeted at positions WINDOW_LOADED or before (e.g., not custom tags positions with a value >33) may be executed (e.g., according to the logic of the doTags ( ) function described earlier).

After the browser is done loading the web page and as the user interacts with the page: if specific events (e.g., clicks, mouse rollovers) have been configured to be tracked by tag container code and/or TMS, each of these events may trigger another call to the tag execution logic (e.g., step 416). The tag container code then execute any (e.g., $3^{rd}$ Party vendor) tags associated with the specific event (and/or any other tags as determined by the tag execution logic of the doTags( ) function described above). Tracked page interaction events may be logged to the TMS' servers, aggregated and stored as summary data. The events may be aggregated by campaign identifier (id) or placement reference. The events may also be written to a cookie, and/or logged in data feed.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention.

What is claimed:

1. A method for asynchronously loading tag management code and one or more vendor tags on a web page while remaining portions of the web page load, the method comprising:
    receiving, by a device, a web page comprising a configuration object configured to cause the device to load tag management code;
    determining, by the device, whether to asynchronously load the tag management code based on a property of the configuration object;
    in response to determining to asynchronously load the tag management code, loading the tag management code into memory of the device while the device continues to load a remainder of the web page;
    requesting, while the device continues to load the remainder of the web page, one or more vendor tags from a server over a network in accordance with the tag management code;
    receiving, by the device while the device continues to load the remainder of the web page, at least one of the one or more vendor tags from the server;
    determining that an asset has a dependency on a particular tag among the one or more vendor tags;
    in response to determining that the asset has a dependency on the particular tag, determining that the particular tag has not been loaded by the device; and
    after determining that the particular tag has not been loaded, making a call to cause the device to wait a specified period of time before continuing to load the remainder of the web page.

2. The method of claim 1, wherein the tag management code comprises a container tag.

3. The method of claim 1, wherein the configuration object is placed on the web page to load the tag management code at the beginning of loading the web page.

4. The method of claim 1, wherein requesting the one or more vendor tags is performed while the device continues to load the tag management code.

5. The method of claim 1, wherein at least one of the one or more vendor tags comprises one or more scripts to be executed synchronously.

6. The method of claim 5, further comprising executing, by the device, the one or more scripts.

7. The method of claim 1, further comprising caching, by the device in accordance with the tag management code, a third party vendor tag for retrieval by a portion of the web page being loaded concurrently.

8. A system comprising:
    a device configured to:
        receive a web page comprising a configuration object configured to cause the device to load tag management code;
        determine whether to asynchronously load the tag management code based on a property of the configuration object;
        in response to determining to asynchronously load the tag management code, load the tag management code into memory of the device while the device continues to load a remainder of the web page;
        retrieve, while the device continues to load the remainder of the web page, one or more vendor tags from a server over a network in accordance with the tag management code;
        determine that an asset has a dependency on a specific tag among the one or more vendor tags;
        in response to determining that the asset has a dependency on the specific tag, determine that the specific tag has not been loaded by the device; and
        in response to determining that the specific tag has not been loaded, make a call and wait a specified period of time after making the call before continuing to load the remainder of the web page; and
    a server configured to:
        store the tag management code;
        receive, from the device, a request for the tag management code; and
        transmit the tag management code to the device in response to receiving the request for the tag management code.

9. The system of claim 8, wherein the configuration object is placed on the web page to load the tag management code at the beginning of loading the web page.

10. The system of claim 8, wherein the tag management code causes the device to request the one or more vendor tags while the tag management code loads asynchronously.

11. The system of claim 8, wherein at least one of the one or more vendor tags comprises one or more scripts to be executed synchronously, and wherein the one or more scripts are written in a programming language different from a programming language of the web page.

12. The system of claim 8, wherein the device is further configured to cache a particular vendor tag, among the one or more vendor tags, for use by a portion of the web page loaded after the particular vendor tag is retrieved.

13. The method of claim 1, further comprising executing, by the device, at least one of the one or more vendor tags to collect analytic data and send the analytic data to the server.

14. The method of claim 1, further comprising executing, by the device, at least one of the one or more vendor tags to collect analytic data and send the analytic data to a third party server different from the server.

15. The method of claim 1, wherein requesting the one or more vendor tags from the server is based on a user of the device, and wherein the at least one of the one or more vendor tags received from the server is configured to collect analytic data from the device and send the analytic data to the server.

16. The method of claim 1, wherein the configuration object is located at a top of a header of the web page or immediately before a closing body tag of the web page.

17. A system, comprising:
    a first server comprising first memory storing a tag container comprising a configuration object that, when executed by a device parsing a web page, controls the device to determine whether to asynchronously load tag management code based on a property of the configuration object, wherein the first server is configured to transmit the tag container for insertion into the web page; and
    a second server comprising:
        one or more processors;
        first memory storing the tag management code;
        second memory storing computer-executable instructions that, when executed by at least one of the one or more processors, cause the second server to:

receive, from the device, a first request to load the tag management code while the device continues to load a remainder of the web page;

in response to the first request, transmit the tag management code to the device;

receive, from the device, a second request to load one or more vendor tags while the device continues to load the remainder of the web page;

in response to the second request, transmit at least one of the one or more vendor tags, wherein the at least one of the one or more vendor tags is configured to collect analytic data from the device and send the analytic data to the server; and receive, from the device in response to a first determination that an asset has a dependency on a particular tag among the one or more vendor tags and a second determination that the particular tag has not been loaded by the device, a call to execute a delay for a specified period of time to cause the device to wait the specified period of time before continuing to load the web page.

18. The system of claim 17, wherein the computer-executable instructions, when executed, further cause the second server to:
determine a user of the device; and
select the one or more vendor tags based on the user of the device.

19. The system of claim 17,
wherein the first request comprises an indication of a client,
wherein the computer-executable instructions, when executed, further cause the second server to identify the tag management code, from among a plurality of client files, that is specific to the client indicated in the first request, and
wherein the first server is different from the second server.

20. One or more non-transitory computer-readable media storing computer-executable instructions, comprising a configuration object and tag management code, that, when executed by at least one processor of a computing device, cause the computing device to:
determine whether to asynchronously load the tag management code based on a property of the configuration object that is embedded in a web page accessed by the computing device;
in response to determining to asynchronously load the tag management code, load the tag management code into memory of the computing device while the computing device continues to load a remainder of the web page;
request, while the computing device continues to load the remainder of the web page, one or more vendor tags from a server over a network in accordance with the tag management code;
receive, while the computing device continues to load the remainder of the web page, at least one of the one or more vendor tags from the server;
determine that an asset has a dependency on a particular tag among the one or more vendor tags;
in response to determining that the asset has a dependency on the particular tag, determine that the particular tag has not been loaded by the computing device; and
in response to determining that the particular tag has not been loaded, make a call to cause the computing device to wait a specified period of time before continuing to load the remainder of the web page.

21. The one or more non-transitory computer-readable media of claim 20, wherein the computing device requests the one or more vendor tags from the server based on a user of the computing device, and wherein the at least one of the one or more vendor tags received from the server is configured to collect analytic data from the computing device.

22. The one or more non-transitory computer-readable media of claim 20, wherein the computer-executable instructions further cause the computing device to:
after waiting the specified period of time, determine whether the particular tag still has not been loaded; and
in response to determining that the particular tag still has not been loaded and in response to determining that a termination threshold time has elapsed, abort loading the particular tag.

23. The one or more non-transitory computer-readable media of claim 22, wherein aborting the loading of the particular tag comprises marking a document object model of the web page complete.

24. The one or more non-transitory computer-readable media of claim 20, wherein the computer-executable instructions further cause the computing device to:
after waiting the specified period of time, determine whether the particular tag still has not been loaded; and
in response to determining that the particular tag still has not been loaded and in response to determining that a termination threshold time has not elapsed, make a second call to cause the computing device to wait for the specified period of time again before continuing to load the remainder of the web page.

25. The one or more non-transitory computer-readable media of claim 24, wherein the computer-executable instructions further cause the computing device to:
set the termination threshold time based on the particular tag that is to be loaded.

26. The one or more non-transitory computer-readable media of claim 20, wherein the call is transmitted to the server and indicates the specified period of time.

* * * * *